US012072753B2

(12) United States Patent
Liu

(10) Patent No.: US 12,072,753 B2
(45) Date of Patent: Aug. 27, 2024

(54) SWITCHING METHOD, WEARABLE DEVICE, AND STORAGE MEDIUM

(71) Applicant: GUANGDONG OPPO MOBILE TELECOMMUNICATIONS CORP., LTD., Guangdong (CN)

(72) Inventor: Enfu Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/046,356

(22) Filed: Oct. 13, 2022

(65) Prior Publication Data

US 2023/0054237 A1 Feb. 23, 2023

Related U.S. Application Data

(63) Continuation of application No. PCT/CN2021/078756, filed on Mar. 2, 2021.

(30) Foreign Application Priority Data

Apr. 15, 2020 (CN) .......................... 202010293805.5

(51) Int. Cl.
*G06F 1/3293* (2019.01)
*G04G 99/00* (2010.01)
(Continued)

(52) U.S. Cl.
CPC ......... *G06F 1/3293* (2013.01); *G04G 99/006* (2013.01); *G06F 1/163* (2013.01);
(Continued)

(58) Field of Classification Search
CPC ...... G06F 1/3293; G06F 1/163; G06F 1/3212; G06F 1/3287; G06F 13/4282; G04G 99/006

See application file for complete search history.

(56) References Cited

U.S. PATENT DOCUMENTS

2015/0365892 A1* 12/2015 Ma .................... H04W 52/0209
455/574
2016/0132369 A1 5/2016 Lee et al.
(Continued)

FOREIGN PATENT DOCUMENTS

| CN | 105204931 | 12/2015 |
|---|---|---|
| CN | 205263518 | 5/2016 |

(Continued)

OTHER PUBLICATIONS

WIPO, International Search Report and Written Opinion for PCT/CN2021/078756, Jun. 8, 2021.
(Continued)

*Primary Examiner* — Glenn A. Auve
(74) *Attorney, Agent, or Firm* — Hodgson Russ LLP

(57) ABSTRACT

A switching method, a wearable device, and a storage medium are provided. The method is performed by the wearable device, and the wearable device includes a first processor and a second processor. The method includes: switching, in response to satisfying a first preset condition and a current operation mode not being a first operation mode, the wearable device to the first operation mode; switching, in response to satisfying a second preset condition and the current operation mode not being a second operation mode, the wearable device to the second operation mode; in the first operation mode, both of the first processor and the second processor are in working states; and in the second operation mode, the first processor is in a non-working state and the second processor is in a working state.

20 Claims, 6 Drawing Sheets

(51) Int. Cl.
  *G06F 1/16*   (2006.01)
  *G06F 1/3212*  (2019.01)
  *G06F 1/3287*  (2019.01)
  *G06F 13/42*  (2006.01)

(52) U.S. Cl.
  CPC .......... *G06F 1/3212* (2013.01); *G06F 1/3287* (2013.01); *G06F 13/4282* (2013.01)

(56) References Cited

U.S. PATENT DOCUMENTS

| | | | |
|---|---|---|---|
| 2017/0075316 A1 | 3/2017 | Berdinis et al. | |
| 2019/0163142 A1 | 5/2019 | Chang et al. | |
| 2019/0346905 A1* | 11/2019 | Song | G06F 1/163 |

FOREIGN PATENT DOCUMENTS

| | | |
|---|---|---|
| CN | 106707735 | 5/2017 |
| CN | 109788461 | 5/2019 |
| CN | 110062446 | 7/2019 |
| CN | 110515462 | 11/2019 |
| CN | 110825207 | 2/2020 |

OTHER PUBLICATIONS

EPO, Extended European Search Report for EP Application No. 21788776.9, Sep. 15, 2023.
CNIPA, First Office Action for CN Application No. 202010293805.5, Dec. 29, 2023.
CNIPA, Second Office Action for CN Application No. 202010293805.5, Apr. 17, 2024.

* cited by examiner

SWITCHING METHOD, WEARABLE DEVICE, AND STORAGE MEDIUM

CROSS-REFERENCE TO RELATED APPLICATION

The application is a continuation of International Application PCT/CN2021/078756, filed Mar. 2, 2021, which claims priority to Chinese Patent Application No. 202010293805.5, filed Apr. 15, 2020. The entire disclosures of the aforementioned applications are incorporated herein by reference.

TECHNICAL FIELD

The disclosure relates to the field of control technologies, and more particularly, to a switching method, a wearable device, and a storage medium.

RELATED ART

At present, a wristband-type wearable device generally has a design structure of single processor, the single processor can only provide single functional mode, resulting in the wristband-type wearable device is unable to meet usage requirements of a user in different usage scenarios.

SUMMARY

Embodiments of the disclosure are to provide a switching method, a wearable device, and a storage medium to solve the above technical problems.

Technical solutions of the disclosure are implemented as follows.

In an aspect, a switching method is provided. The switching method is performed by a wearable device, the wearable device includes a first processor and a second processor, and the method includes:
  switching, in response to satisfying a first preset condition and a current operation mode not being a first operation mode, the wearable device to the first operation mode;
  switching, in response to satisfying a second preset condition and the current operation mode not being a second operation mode, the wearable device to the second operation mode;
  where in the first operation mode, both of the first processor and the second processor are in working states; and in the second operation mode, the first processor is in a non-working state and the second processor is in a working state.

In another aspect, a wearable device is provided. The wearable device includes: a first processor and a second processor;
  both of the first processor and the second processor are in working states when the wearable device is in a first operation mode; where the first processor is in a non-working state while the second processor is in a working state when the wearable device is in a second operation mode;
  the second processor is configured to switch, in response to satisfying a first preset condition and a current operation mode not being the first operation mode, the wearable device to the first operation mode;
  the first processor is configured to switch, in response to satisfying a second preset condition and the current operation mode not being the second operation mode, the wearable device to the second operation mode.

In still another aspect, a non-transitory computer-readable storage medium stored with a computer program is provided. The computer program is configured to, when executed by processors, implement operations of the above method.

Embodiments of the disclosure provide the switching method, the wearable device, and the storage medium. The method is performed by a wearable device including the first processor and the second processor, and the method includes operations as follows. In response to satisfying a first preset condition and a current operation mode not being a first operation mode, the wearable device is switched to the first operation mode. In response to satisfying a second preset condition and the current operation mode not being a second operation mode, the wearable device is switched to the second operation mode. In the first operation mode, both of the first processor and the second processor are in working states; and in the second operation mode, the first processor is in a non-working state and the second processor is in a working state.

DETAILED DESCRIPTION

In order to provide a thorough understanding of features and technical contents of the embodiments of the disclosure, implementations of the embodiments of the disclosure will be described in detail with reference to the drawings. The drawings are for illustrative purposes only, and should not be construed as limitations of the embodiments of the disclosure.

Some embodiments of the disclosure provide a wearable device, the wearable device includes a first processor and a second processor, and the disclosure further provides a switching method for the wearable device with such dual processor structure. In practice, a form of the wearable device may be in a mainstream product form or a non-mainstream product form. The mainstream product form includes a category of wrist-based watch (including products such as a watch and a wristband), a category of foot-based shoes (including products such as shoes, socks, or other leg-worn products in the future), a category of head-based glass (including products such as glasses, a helmet, a headband). The non-mainstream product form includes various categories such as smart clothing, a school bag, crutch, and an accessory.

Figure 1:
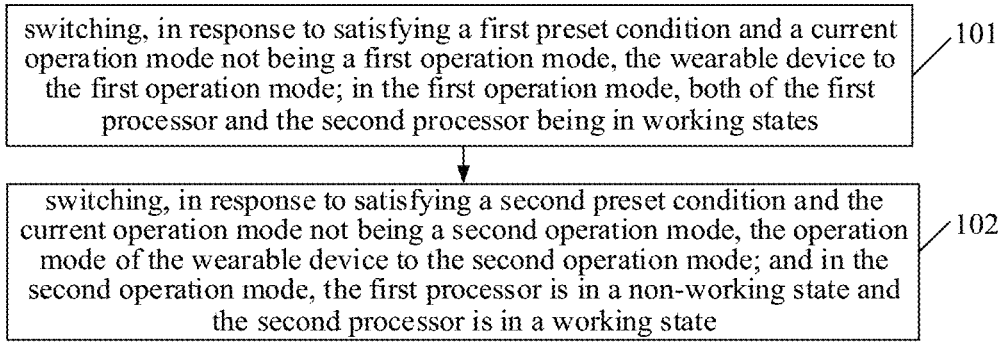
FIG. 1 is a schematic first flowchart of a switching method according to some embodiments of the disclosure.

FIG. 1 is a schematic first flowchart of a switching method according to some embodiments of the disclosure. As illustrated in FIG. 1, the method may specifically include operations as follows.

At operation 101, in response to satisfying a first preset condition and a current operation mode not being a first operation mode, the wearable device is switched to the first operation mode; and in the first operation mode, both of the first processor and the second processor are in working states.

The first preset condition is configured to trigger execution of the first operation mode. In some embodiments, the first preset condition may include any one of the following conditions that: a battery level of the wearable device is greater than a first battery level threshold, the wearable device is detected as entering a charging state, and a first switching instruction configured to instruct the wearable device to switch to the first operation mode is detected.

For example, it is illustrated by taking the first operation mode being a mode with high power consumption as an example. The wearable device controls itself to be in the first operation mode in response to detecting that the battery level is sufficient; or, the wearable device controls itself to be in the first operation mode in response to detecting that the wearable device enters the charging state; or, the wearable device controls itself to be in the first operation mode in response to detecting the first switching instruction, which is configured to instruct the wearable device to switch to the first operation mode and may be generated based on a user's control operation.

For example, the first switching instruction may be generated based on the user's control operation directly performed on the wearable device, the first switching instruction may be generated based on a user's operation performed on a switching button, or based on any control operation of the wearable device from the user. For another example, the first switching instruction may be a switching instruction generated based on the user's control operation performed on a terminal, and the switching instruction is then transmitted from the terminal to the wearable device.

At operation 102, in response to satisfying a second preset condition and the current operation mode not being a second operation mode, the wearable device is switched to the second operation mode; and in the second operation mode, the first processor is in a non-working state and the second processor is in a working state.

The second condition is configured to trigger execution of the second operation mode. In some embodiments, the second preset condition includes any one of the following conditions that: the battery level of the wearable device is less than a second battery level threshold; and a second switching instruction configured to instruct the wearable device to switch to the second operation mode is detected.

For example, it is illustrated by taking the second operation mode as a mode with low power consumption as an example. When a low battery level is detected, the wearable device controls itself to be in the second operation mode to prolong the use of the device; or, the wearable device controls itself to be in the second operation mode in response to detecting the second switching instruction, which is configured to instruct the wearable device to switch to the second operation mode and may be generated based on a user's control operation.

For example, the second switching instruction may be generated based on the user's control operation directly performed on the wearable device, the second switching instruction may be generated based on a user's operation performed on a switching button, or based on any control operation of the wearable device from the user. For another example, the second switching instruction may be a switching instruction generated based on the user's control operation performed on the terminal, and the switching instruction is then transmitted from the terminal to the wearable device.

In some embodiments, the second preset condition may be satisfied in response to determining that the wearable device has been in the first operation mode for over a certain period without detecting any operation instruction. For example, when the wearable device is in the first operation mode with high power consumption and no user operation is detected within a preset period, the wearable device may automatically switch from the first operation mode to the second operation mode with low power consumption.

In some embodiments, in the first operation mode, the first processor runs a first operating system, the second processor runs a second operating system, and the first processor and the second processor communicate with each other through a serial peripheral interface (SPI); and in the second operation mode, the second processor runs the second operating system.

In other words, the wearable device has a structure of dual-processor and dual-system, with the first processor running the first operating system, the second processor running the second operating system, and the two operation modes each configured with a matching operating system according to different functions of the operation modes. In this way, a processing efficiency of the wearable device is improved. The first operating system may be an Android operating system, and the second operating system may be a real time operating system (RTOS). The wearable device is provided with dual processors, the two processors respectively control the wearable device to be in different operation modes to enable different operation modes of the wearable device for different usage scenarios, thereby meeting the usage requirements of different scenarios.

In some embodiments, the wearable device further includes a first type of component and a second type of component. In the first operation mode, the first operating system controls an operation of the first type of component, and the second operating system controls an operation of the second type of component. In the second operation mode, the second operating system controls operations of both the first type of component and the second type of component.

In practice, the first type of components support complex logical operations and have high power consumption, and the first type of components require high processor performance; and the second type of components support simple logical operations and have low power consumption, and the second type of components require low processor performance. For example, the first operation mode is a normal mode in which any user operation performed on the wearable device can be responded to, and the second operation mode is an ultra-long standby mode (i.e., a low-consumption operation mode) in which only a few operation instructions such as wake-up can be responded to.

Alternatively, the first type of component is configured to implement a first function of the wearable device, and the second type of component is configured to implement a second function of the wearable device.

In some other embodiments, in the first operation mode, the first type of component is controlled to work in the first operating system, and the second type of component stops working; in the second operation mode, the second type of component is controlled to work in the second operating system, and the first type of component stops working. In other words, the first type of component and the second type of component are controlled by different operating systems and do not interfere with each other.

Figure 2:
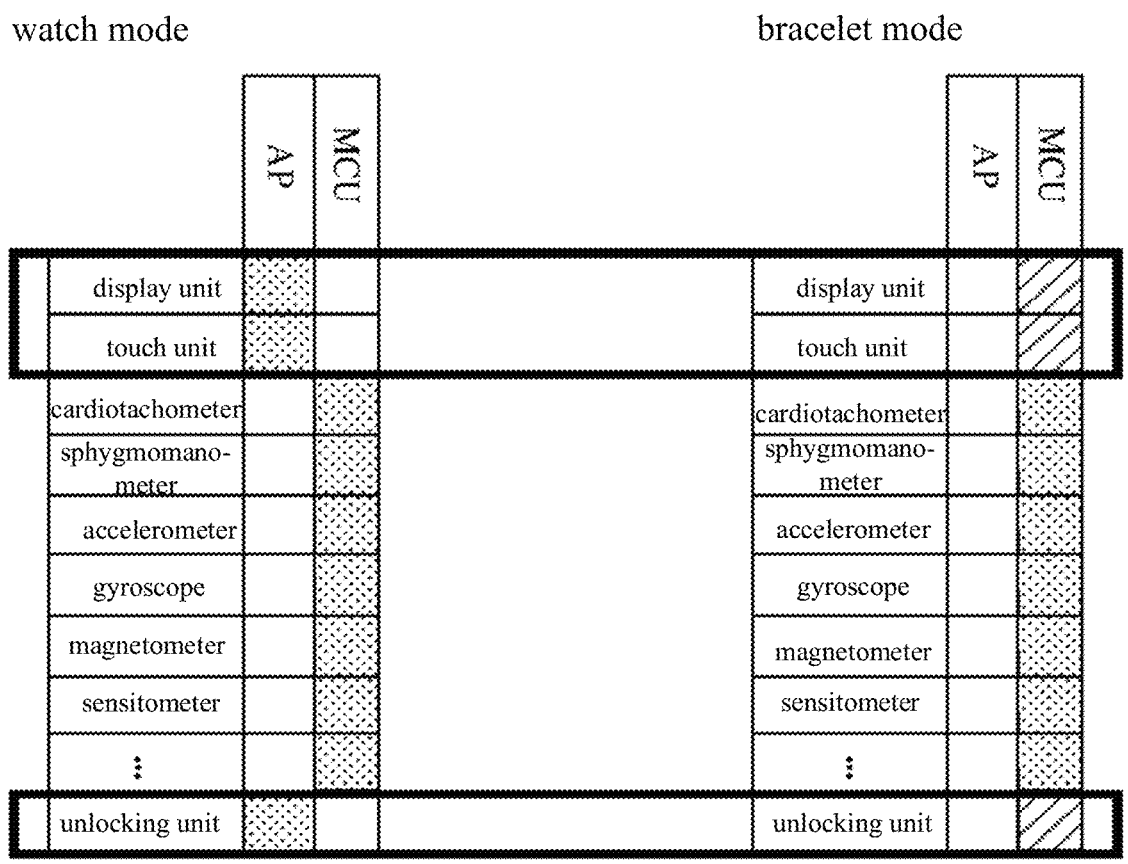
FIG. 2 is a schematic structural diagram of a wearable device according to some embodiments of the disclosure.

FIG. 2 is a schematic structural diagram of a wearable device according to some embodiments of the disclosure. As illustrated in FIG. 2, it is illustrated by taking the wearable device being a smartwatch as an example. Specifically, the first operation mode is a watch mode, the second operation mode is a bracelet mode, the first processor is an application processor (AP), the second processor is a microcontroller unit (MCU), and devices of the smartwatch includes: a display (a display unit, also referred to display device), a touch control unit (also referred to touch control device), a cardiotachometer, a sphygmomanometer, an accelerometer, a gyroscope, a magnetometer, a sensitometer, an unlocking unit (also referred to unlocking device), and etc. In the first operation mode, the AP controls the devices such as the display unit, the touch control unit and the unlocking unit, and the MCU controls the devices such as the sphygmomanometer, the accelerometer, the gyroscope, the magnetometer, and the sensitometer. In the second operation mode, the AP stops working, and the MCU takes over the first type of components which are previously controlled by the AP, that is, the MCU takes over the display, the touch control unit, and the unlocking unit, and the MCU continues to control the device requiring low processing performance or having low power consumption, such as the sphygmomanometer, the accelerometer, the gyroscope, the magnetometer, and the sensitometer. In practice, the heart rate detection method performed by the cardiotachometer may be a combination of Photoplethysmography (PPC) and electrocardiogram (ECG).

Specifically, the first type of components include the devices under the control of the AP, such as the display unit, the touch control unit, and the unlocking unit; and the second type of components include the devices under the control of the MCU, such as the cardiotachometer, the sphygmomanometer, the accelerometer, the gyroscope, the magnetometer, the sensitometer.

In some embodiments, the wearable device further includes a third type of component; in the first operation mode, the first operating system controls an operation of the third type of component, and in the second operation mode, the third type of device stops working.

For example, the third type of component may be a microphone, which is required to capture user voice information in the watch mode (i.e., first operation mode) and is not required to work in the bracelet mode (i.e., second operation mode) where no function related to the user voice information is required to be configured.

In practice, the first processor may refer to a master processor, which is capable of processing complex logic operations and has high power consumption, the second processor may refer to a coprocessor, which is capable of processing simple logic operations and has low power consumption. The master processor outperforms the coprocessor. The master processor is configured to process data from a greater quantity of devices, and the coprocessor is configured to process data from a smaller quantity of devices. In order to reduce the power consumption of the wearable device, when the first preset condition is satisfied, the first processor works, and whether the second processor works or not may be determined based on actual needs; and when the second preset condition is satisfied, the first processor stops working, and the second processor works. For example, the master processor is an application processor (AP) or a system-on-a-chip (SoC), and the coprocessor is a microcontroller unit (MCU). In practice, the first processor and the second processor may communicate with each other through an inter-integrated circuit (I2C).

Figure 3:
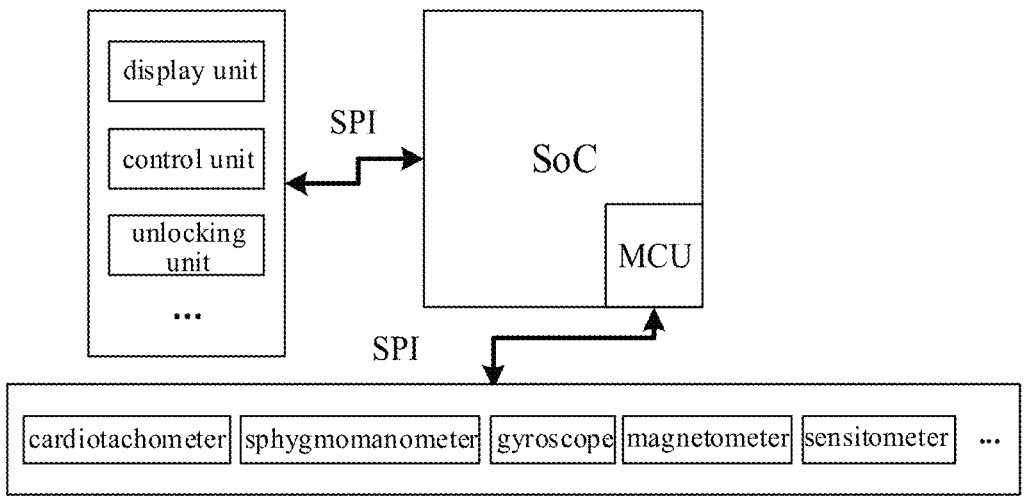
FIG. 3 is a schematic diagram illustrating a first hardware structure of a dual processor structure according to some embodiments of the disclosure.

FIG. 3 is a schematic diagram illustrating a first hardware structure of a dual processor structure according to some embodiments of the disclosure. As illustrated in FIG. 3, the first processor is a SoC, the second processor is a MCU, the MCU is built into the SoC, the SoC runs the Android system and the MCU runs the lightweight RTOS, the SoC is connected to the controlled devices of the first type through the SPI, and the MCU is connected to the controlled second type of devices through the SPI.

Figure 4:
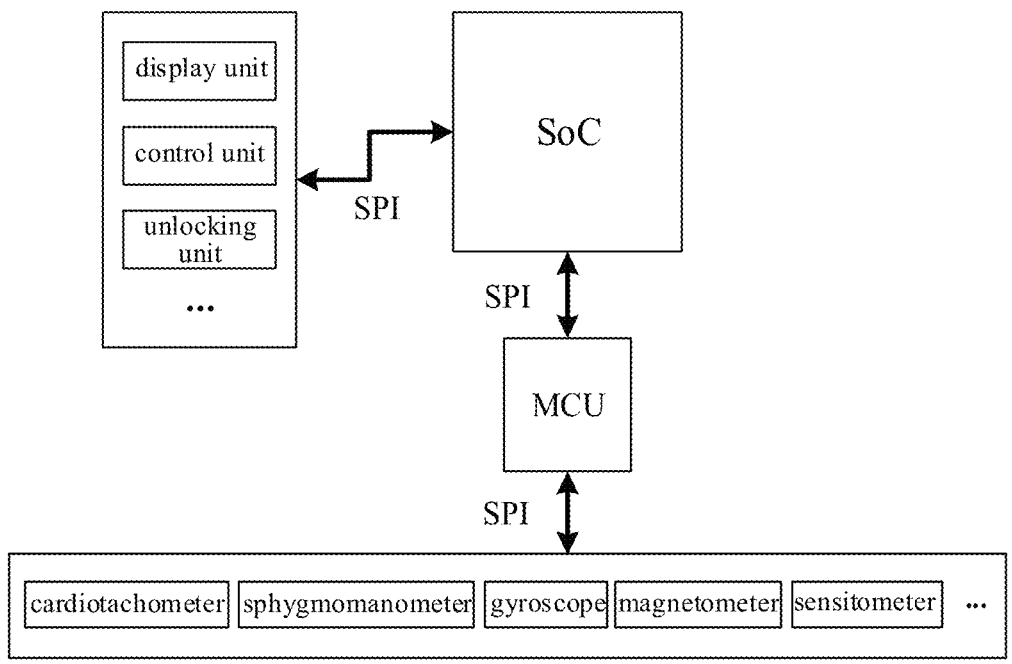
FIG. 4 is a schematic diagram illustrating a second hardware structure of the dual processor structure according to some embodiments of the disclosure.

FIG. 4 is a schematic diagram illustrating a second hardware structure of the dual processor structure according to some embodiments of the disclosure. As illustrated in FIG. 4, MCU is disposed separately from the SoC, and the SoC is connected to the MCU through the SPI. Likewise, the SoC runs the Android system, the MCU runs the lightweight RTOS, the SoC is connected to the controlled devices of the first device through the SPI, and the MCU may be connected to the controlled devices of the second device through the SPI.

In practice, the above two implementations may also be applied to a setting implementation for the first processor and second processor of other types.

In practice, the first processor and the second processor are also configured to control the wearable device to communicate with a terminal device.

Specifically, the wearable device further includes a first communication unit (also referred to as first communication circuit) and a second communication unit (also referred to as second communication circuit), the first communication unit and the second communication unit are configured to establish a communication connection between the wearable device and the terminal device. In the first operation mode, the first communication unit is in a working state, and the second communication unit is in a non-working state; in the second operation mode, the first communication unit is in a non-working state, and the second communication unit is in a working state. In other words, for different operation modes, different communication units are controlled to establish the communication connection with the terminal device.

Figure 5:
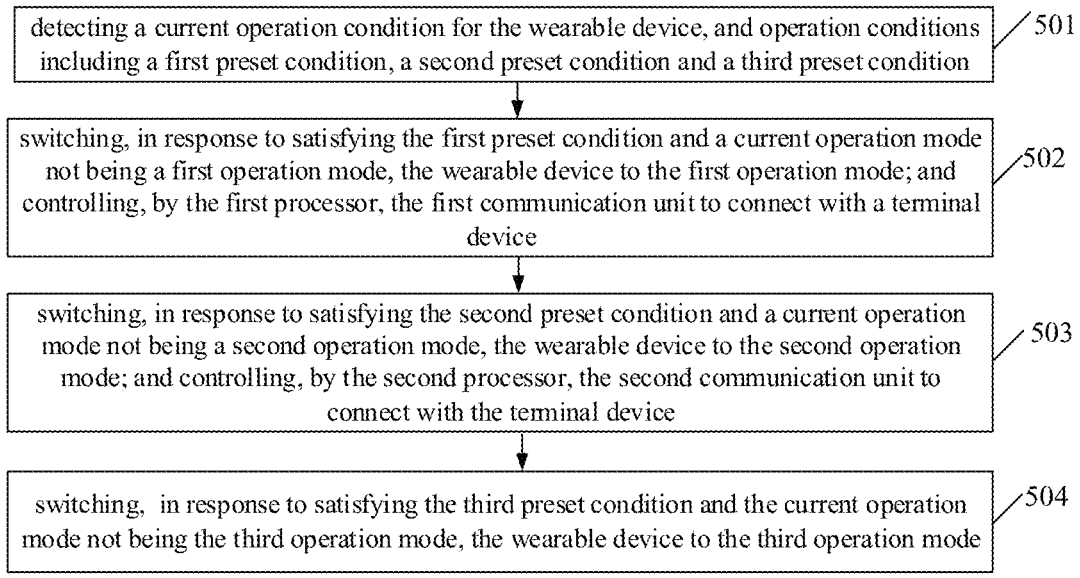
FIG. 5 is a schematic second flowchart of the switching method according to some embodiments of the disclosure.

Based on the above dual processor structure, the disclosure further provides a specific switching method. FIG. 5 is a schematic second flowchart of the switching method according to some embodiments of the disclosure. As illustrated in FIG. 5, the method may specifically include operations as follows.

At block 501, a current operation condition for the wearable device is detected, where operation conditions at least include a first preset condition, a second preset condition and a third preset condition.

Specifically, the first preset condition is configured to trigger execution of the first operation mode, and the second preset condition is configured to trigger execution of the second operation mode.

In some embodiments, the first preset condition includes any one of the following conditions that: a battery level of the wearable device is greater than a first battery level threshold, the wearable device is detected as entering a charging state, and a first switching instruction configured to instruct the wearable device to switch to the first operation mode is detected.

For example, the first operation mode is a mode with high power consumption, and the wearable device controls itself to be in the first operation mode in response to detecting that the battery level is sufficient; or, the wearable device controls itself to be in the first operation mode when the wearable device is detected as entering the charging state; or, the wearable device controls itself to be in the first operation mode in response to detecting the first switching instruction, which is configured to instruct the wearable device to switch the operation mode to the first operation mode and may be generated based on a user's control operation.

The second preset condition includes any of the following conditions: the wearable device's battery level is less than a second battery level threshold; a second switching instruction configured to instruct the wearable device to switch to the second operation mode is detected.

For example, the second operation mode is a mode with low power consumption, and the wearable device controls, in response to detecting a low battery level, itself to be in the second operation mode, thereby prolonging the use of the device; or, the wearable device controls itself to be in the second operation mode in response to detecting the second switching instruction, which is configured to instruct the wearable device to switch the operation mode to the second operation mode and may be generated based on a user's control operation.

The third preset condition is satisfied in response to detecting a third switching instruction, which is configured to instruct the wearable device to switch to the third operation mode. The current operation mode may be the first operation mode or the second operation mode.

Any of the above switching instructions (including the first switching instruction, the second switching instruction, and the third switching instruction) may be generated based on the user's control operation directly performed on the wearable device, the switching instruction may alternatively be generated based on a user's operation performed on a switching button, or based on any control operation of the wearable device issued by the user. Alternatively, the switching instruction may be generated based on the user's control operation performed on a terminal and is then transmitted from the terminal to the wearable device.

At block 502, the wearable device is switched to the first operation mode, in response to satisfying the first preset condition and the current operation mode not being a first operation mode; and the first processor controls the first communication unit to connect with a terminal device.

In other words, in the first operation mode, the first communication unit is in the working state, and the second communication is in the non-working state.

In some embodiments, the switching the wearable device to the first operation mode when the current operation mode is the second operation mode, includes: rebooting the wearable device; enabling the first communication unit and establishing a communication connection between the terminal device and the first communication unit; and controlling the operation of the first type of component by the first operating system.

In other words, when the operation mode of the wearable device is switched to the first operation mode, the wearable device is required to be rebooted, and after the rebooting, the first processor is first booted, and then the first processor controls the first communication unit to establish a communication connection with the terminal device; alternatively, after the rebooting, the first processor and the first communication unit are booted simultaneously.

In some other embodiments, when the current operation mode is the second operation mode, the first communication unit is directly booted to establish a communication connection between the terminal device and the first communication unit.

At block 503: the wearable device is switched to the second operation mode, in response to satisfying the second preset condition and the current operation mode not being the second operation mode; the second processor controls the second communication unit to connect with the terminal device.

In other words, when the wearable device is in the second operation mode, the first communication unit is in the non-working state, and the second communication unit is in the working state.

In some embodiments, the switching the wearable device to the second operation mode when the current operation mode is the first operation mode includes: shutting down the first processor and the first communication unit, and thereby disconnecting a communication connection between the terminal device and the first communication unit; enabling the second communication unit and establishing a communication connection between the terminal device and the second communication unit; and taking over and controlling the operation of the first type of component by the second operating system.

In practice, the second processor may be configured to determine whether the wearable device satisfies the first preset condition or the second preset condition. Specifically, when the wearable device is in the second operation mode, in response to determining that the first preset condition is satisfied, the second processor transmits a start instruction to the first processor to trigger the working state of the first processor, the first processor enables the first communication unit; alternatively, the second processor simultaneously enables the first processor and the first communication unit. When the wearable device is in the first operation mode, in response to determining that the second preset condition is satisfied, the second processor transmits a shutdown instruction to the first processor, so that the first processor is triggered to disable the first communication unit, and the first processor then enters the non-working state; alternatively, the second processor simultaneously triggers the shutdown of the first processor and the first communication unit.

In practice, other components of the terminal device may also be configured to determine whether the electronic device satisfies the first preset condition or the second preset condition, and then transmits a result of the determination to the first processor or the second processor.

Furthermore, before shutting down the first processor and the first communication unit, the method further includes: acquiring mode switching information through communication connection and negotiation between the first communication unit and the terminal device, the mode switching information being configured to indicate connection information for the wearable device after being switched to the second operation mode; and the operation of the establishing a communication connection between the terminal device and the second communication unit includes: searching for the second communication unit according to the mode switching information and establishing the communication connection with the second communication unit, by the terminal device.

Specifically, the mode switching information is configured to instruct the terminal device to establish a first time connection or a next time connection (i.e., a reconnection) with the second communication unit. Specifically, after the terminal device and the wearable device are connected through the first communication unit, the first communication unit transmits the mode switching information to the terminal device, so as to notify the terminal device of connection information of the second communication unit of the terminal device and a next switching operation of the wearable device. In this way, the terminal device is enabled to switch a connection object from the first communication unit to the second communication unit according to the mode switching information. For example, the wearable device notifies the terminal device that the first operation mode will be switched to the second operation mode after 10 seconds, and instructs the terminal device to actively reconnect to the wearable device after 10 seconds, thereby improving the connection efficiency between the wearable device and the terminal device.

In some embodiments, after the terminal device receives the mode switching information, the terminal device generates a connection instruction according to the mode switching information, the terminal device then transmits the connection instruction to the wearable device, and the wearable device establishes the communication connection with the terminal device according to the connection instruction.

Specifically, the connection instructions include a first connection instruction and a second connection instruction. When the first communication unit works, the first communication unit receives the first connection instruction, and establishes the communication connection with the terminal device based on the first connection instruction; when the second communication unit works, the second communication unit receives the second connection instruction, and establishes the communication connection with the terminal device based on the second connection instruction.

In some embodiments, after the wearable device has been connected to the terminal device, the method further includes: transmitting, in response to the current operation mode being the first operation mode, connection configuration information of the second communication unit to the terminal device; transmitting, in response to the current operation mode being the second operation mode, connection configuration information of the first communication unit to the terminal device.

Specifically, the connection configuration information is configured to perform connection and pairing between the terminal device and the communication unit. In the first operation mode, the first communication unit is connected to the terminal device, and the first communication unit transmits the connection configuration information of the second communication unit to the terminal device, so as to enable the terminal device to perform the connection and the pairing with the second communication unit. In the second operation mode, the second communication unit is connected to the terminal device, and the second communication unit transmits the connection configuration information of the first communication unit to the terminal device, so as to enable the terminal device to perform the connection and the pairing with the first communication unit.

Specifically, when the current operation mode is the first operation mode, the first communication unit transmits the connection configuration information of the second communication unit to the terminal device, the first communication unit stops transmitting in response to determining that the terminal device receives the connection configuration information successfully, or the first communication unit continues transmitting in response to determining that the terminal device fails to receive the connection configuration information. When the current operation mode is the second operation mode, the second communication unit continuously transmits the connection configuration information of the first communication unit to the terminal device, the second communication unit sops transmitting in response to determining that the terminal device receives the connection configuration information successfully, or the second communication unit continues transmitting in response to determining that the terminal device fails to receive the connection configuration information.

Alternatively, when the current operation mode is the first operation mode, the first communication unit periodically and continuously transmits the connection configuration information of the second communication unit to the terminal device; when the current operation mode is the second operation mode, the second communication unit periodically and continuously transmits the connection configuration information of the first communication unit to the terminal device.

In some illustrated embodiments, when the wearable device is paired with the terminal device for the first time, the first communication unit is first connected with the terminal device, the first processor then controls the first communication unit to transmit the connection configuration information of the second communication unit to the terminal device, so as to enable the terminal device to configure the connection based on the connection configuration information of the second communication unit. Alternatively, when the wearable device is paired with the terminal device for the first time, the second communication unit is first connected with the terminal device, the first processor then controls the first communication unit to transmit the connection configuration information of the second communication unit to the terminal device, so as to enable the terminal device to configure the connection based on the connection configuration information of the first communication unit. In other words, the connection configuration information is transmitted to the terminal device only when the wearable device is paired with the terminal device for the first time, and the terminal device may save the connection configuration information for a next connection; alternatively, the terminal device does not save the connection configuration information, and the wearable device transmits the connection configuration information for each connection.

In some exemplary embodiments, the above operation of transmitting the connection configuration information may also be performed when the wearable device is paired with the terminal device for the non-first time. That is, the wearable device performs the above operation of transmitting the connection configuration information each time the connection is established between the wearable device and the terminal device.

In some embodiments, in response to determining that the second preset condition is satisfied and the current operation mode is not the second operation mode, when the terminal device is connected with the first communication unit, the first processor first controls the first communication unit to disconnect from the terminal device, the first processor then controls the second processor to enable the second communication unit thereby to establish the connection between the second communication unit and the terminal device; when the terminal device is disconnected from the second communication unit, the first processor directly controls the second processor to enable the second communication unit.

In some embodiments, the wearable device further includes the first type of component and the second type of component; in the first operation mode, the first operating system controls operations of the first type of component, and the second operating system controls operations of the second type of component; in the second operation mode, the second operating system controls the operations of the first type of component and the second type of component.

In some other embodiments, in the first operation mode, the first operating system controls operations of the first type of component, and the second type of component stops working; and in the second operation mode, the second operating system controls operations of the second type of component, and the first type of component stops working. In other words, the first type of component and the second type of component are controlled in different operating systems and do not interfere with each other.

In some embodiments, in the first operation mode, the first processor runs the first operating system; in the second operation mode, the second processor runs the second operating system.

In some embodiments, when the second preset condition is satisfied, the method further includes: when the first communication unit is connected with the terminal device, the first processor controls the first communication unit to disconnect from the terminal device, and triggers the second processor to enable the second communication unit; when the first communication unit is disconnected from the terminal device, the first processor triggers the second processor to enable the second communication unit.

In other words, when the second preset condition is satisfied, in response to the terminal device being connected with the second communication unit, the first processor first controls the first communication unit to disconnect from the terminal device, and the first processor then controls the second processor to enable the second communication unit, so as to enable the second communication to establish the connection with the terminal device. When the second preset condition is satisfied, in response to the terminal device being disconnected from the second communication unit, the first processor directly controls the second processor to enable the second communication unit. The first processor, as the master processor, may not only control the operation of the first type of component related to the first processor, but also be able to control an operation of the second processor.

At block 504: the operation mode of the wearable device is switched to the third operation mode, in response to satisfying the third preset condition and the current operation mode not being the third operation mode.

In some embodiments, when the wearable device is in the third operation mode, the first processor is in a working state, the second processor is in a non-working state, and the first processor controls the first communication to establish the connection with the terminal device.

In some other embodiments, when the wearable device is in the third operation mode, both of the first communication unit and the second communication unit are in the non-working state, that is, the wearable device is disconnected from the terminal device.

In some exemplary embodiments, the third operation mode refers to a daytime usage mode, and the third preset condition is accordingly that a system time belongs to day time corresponding to a time zone in which the wearable device is located, or an ambient brightness is greater than a preset brightness threshold. When the third preset condition is satisfied, the wearable device controls itself to be in the third operation mode.

In some other exemplary embodiments, the third operation mode may be a night usage mode, and the third preset condition is accordingly that the system time belongs to night time corresponding to a time zone in which the wearable device is located, or the ambient brightness is less than a preset brightness threshold. When the third preset condition is satisfied, the wearable device controls itself to be in the third operation mode.

By implementing the above technical solutions, the wearable device is provided with the dual processor structure and various operation modes, and the two processors control the wearable device to work in different operation modes for different usage scenarios, thereby meeting the usage requirements of the different usage scenarios.

Based on the above embodiments, the wearable device is taken as the smartwatch to provide three application scenarios as follows. In the scenario described below, the first operation mode of the smartwatch is the watch mode, and the second operation mode is the bracelet mode. The watch mode is a normal operation mode of the smartwatch, and the bracelet mode is the low-consumption operation mode of the smartwatch.

Figure 6:
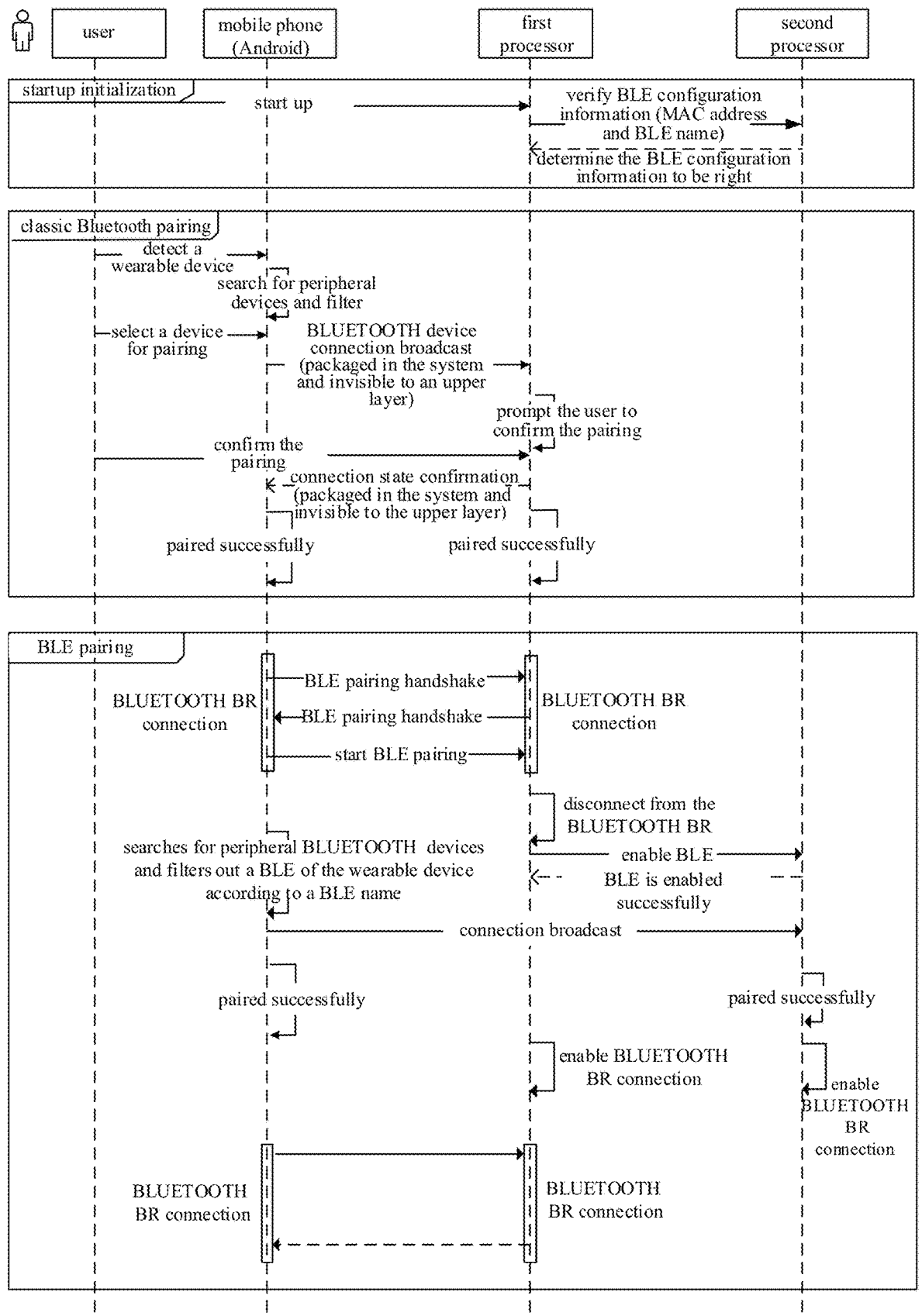
FIG. 6 is a schematic flowchart illustrating connection and pairing between a terminal and the wearable device according to some embodiments of the disclosure.

A first scenario refers to a connection and pairing process for dual BLUETOOTH of a classic BLUETOOTH communication unit such as BLUETOOTH basic rate (BR) or enhanced data rate (EDR), a low-consumption BLUETOOTH communication unit such as BLUETOOTH low energy (BLE). Specifically, the classic BLUETOOTH communication unit refers to the first communication unit controlled by the first processor, and the low-consumption BLUETOOTH communication unit refers to the second communication unit controlled by the second processor. FIG. 6 is a schematic flowchart illustrating connection and pairing between a terminal and the wearable device according to some embodiments of the disclosure. As shown in FIG. 6, the process specifically includes operations as follows.

Operation 601 refers to startup initialization.

Specifically, a startup operation is performed on the smartwatch by the user; BLE configuration information (at least including MAC address and BLE name) is verified; and the BLE configuration information is determined to be correct.

Operation 602 refers to the communication and pairing between the classic BLUETOOTH communication unit and the mobile phone Specifically, the mobile phone detects a wearable device upon an user's operation performed on the mobile phone; the mobile phone searches for peripheral devices and filters the peripheral devices to obtain searched devices; a device from the searched devices is selected by the user for pairing; the mobile phone transmits a BLUETOOTH device connection broadcast (which is packaged in the system and is invisible to an upper layer); the first processor controls display of a prompt message, which is configured to prompt the user to confirm the pairing; a pairing confirmation operation is performed on the wearable device by the user after noticing the prompt message; the first processor controls the BLUETOOTH BR to transmit a connection state confirmation (which is packaged in the system and is invisible to the upper layer) to the mobile phone; the first processor and the mobile phone are paired successfully, the first processor generate a prompt message for successful pairing, and the mobile phone likewise generates a prompt message for successful pairing Operation 603 refers to communication and pairing between the BLE communication unit and the mobile phone.

Specifically, the mobile phone and the first processor transmit a BLE pairing handshake to each other through a BR connection, the mobile start the BLE pairing upon receiving the BLE pairing handshake; the first processor is controlled to disconnect the BLUETOOTH BR connection; the first processor transmits an a BLE startup instruction, the second processor enables the BLE and returns a successful startup confirmation to the first processor; the mobile phone searches for peripheral BLUETOOTH devices and filters out the BLE of the wearable device according to a BLE name, and the mobile phone sends out a connection broadcast; the second processor confirms the connection in the background; the mobile phone and the BLE are paired successfully; a BLUETOOTH BR connection is established, specifically, the second processor turns off the BLE, controls the first processor to enable the BLUETOOTH BR, and the first processor controls the BR BLUETOOTH to establish a communication connection with the mobile phone.

Figure 7:
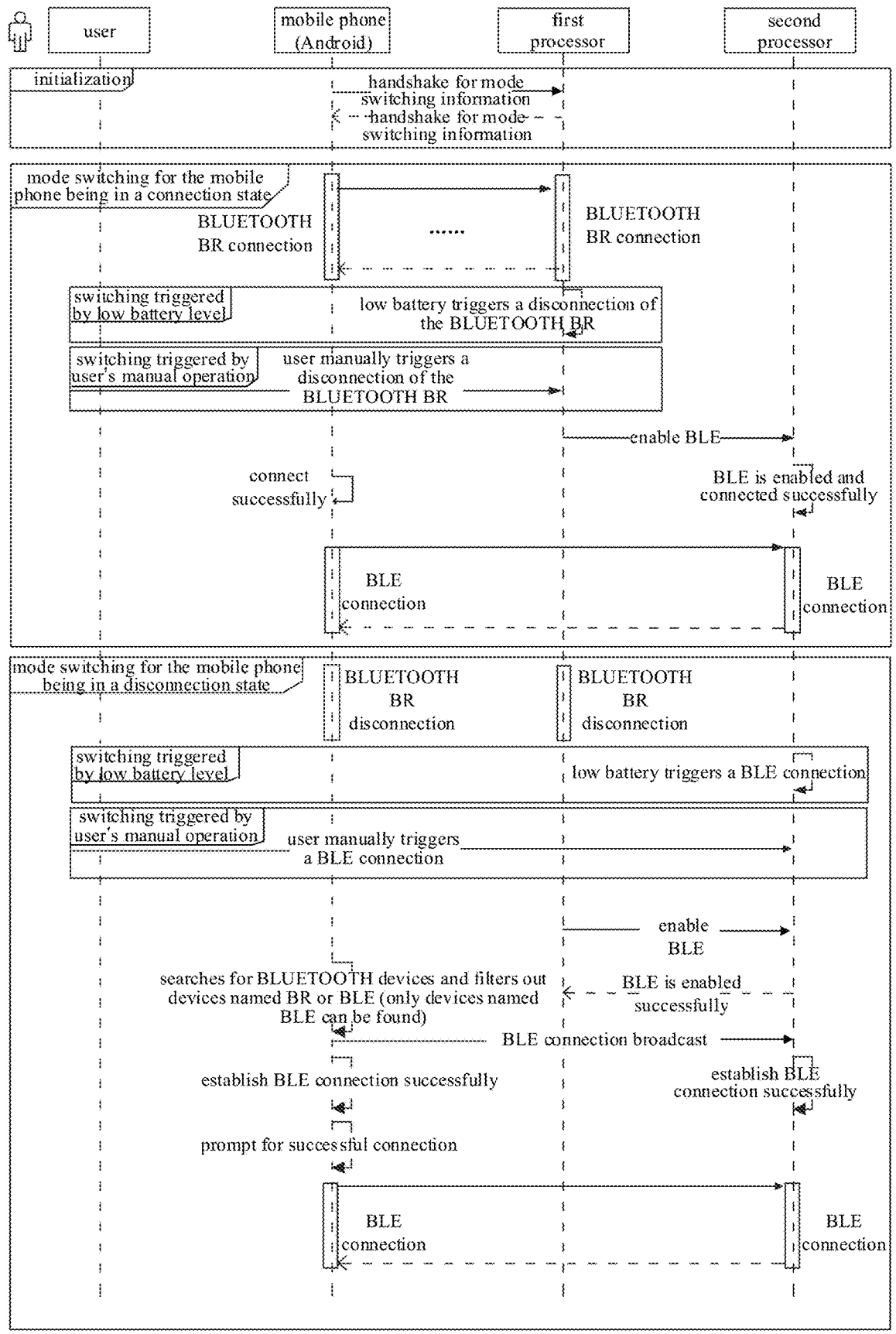
FIG. 7 is a schematic flowchart illustrating a first switching between the terminal and the wearable device according to some embodiments of the disclosure.

A second scenario refers to a switching process for low battery level. FIG. 7 is a schematic flowchart illustrating a first switching between the terminal and the wearable device according to some embodiments of the disclosure. As illustrated in FIG. 7, the process specifically includes operations as follows.

Operation 701 refers to initialization.

Specifically, a handshake for mode switching information is performed between the mobile phone and the first processor.

When the smartwatch and the mobile phone are in a BR connection state, the BLUETOOTH BR and the mobile phone exchange the mode switching information, where the mode switching information is configured to instruct the connection information for the wearable device after being switched to the second operation mode. Specifically, the mode switching information includes at least switching information and BLE connection information, the mobile phone may determine the switching time according to the switching information, and enable the communication connection between the mobile phone and the BLE according to the BLE connection information Operation 702 refers to mode switching for the mobile phone being in a connection state.

Specifically, when the BR BLUETOOTH and the mobile phone are controlled to be in the BR connection state by the first processor (that is, the mobile phone is connected to the first communication unit), a switch may be triggered in response to a low battery level or a user's manual operation. Specifically, when the battery level is low, the first processor controls the BLUETOOTH BR to turn off thereby disconnecting the BR connection; alternatively, in response to detecting a user's switching instruction, the first processor controls the BR BLUETOOTH to turn off thereby disconnecting the BR disconnection. The first processor transmits a BLE startup instruction to the second processor; the second processor enables the BLE, and controls the BLE to establish a communication connection with the mobile phone, so that the mobile phone is successfully connected with the BLE, i.e., the second communication unit.

In practice, when the BR BLUETOOTH and BLE share a same radio frequency (RF) unit, it is necessary to shut down the RF unit before shutting down the BR BLUETOOTH, and the RF unit is required to be rebooted for enabling the BLE.

Operation 703 refers to mode switching for the mobile phone being in a disconnection state.

Specifically, when the mobile phone and the BLUETOOTH BR are in a BR disconnection state (that is, the mobile phone is disconnected from the first communication unit), a switch may be triggered in response to the low battery level or the user's manual operation. When the BR connection has been disconnected, the first processor transmits the BLE startup instruction to the second processor; the second processor enables the BLE, and returns a successful startup indication to the first processor. The mobile phone searches for the BLUETOOTH device, and filters out the devices whose BLUETOOTH device names are BR or BLE. Since the BLUETOOTH BR is in an unavailable state and BLE is in an available state, only the device whose names is BLE may communicate with the mobile phone. The mobile phone sends out a BLE connection broadcast; the second processor controls the BLE to establish a successful connection with the mobile phone; the mobile phone generates a prompt for successful connection, and the mobile phone and the smartwatch are in the BLE connection state at this time.

Figure 8:
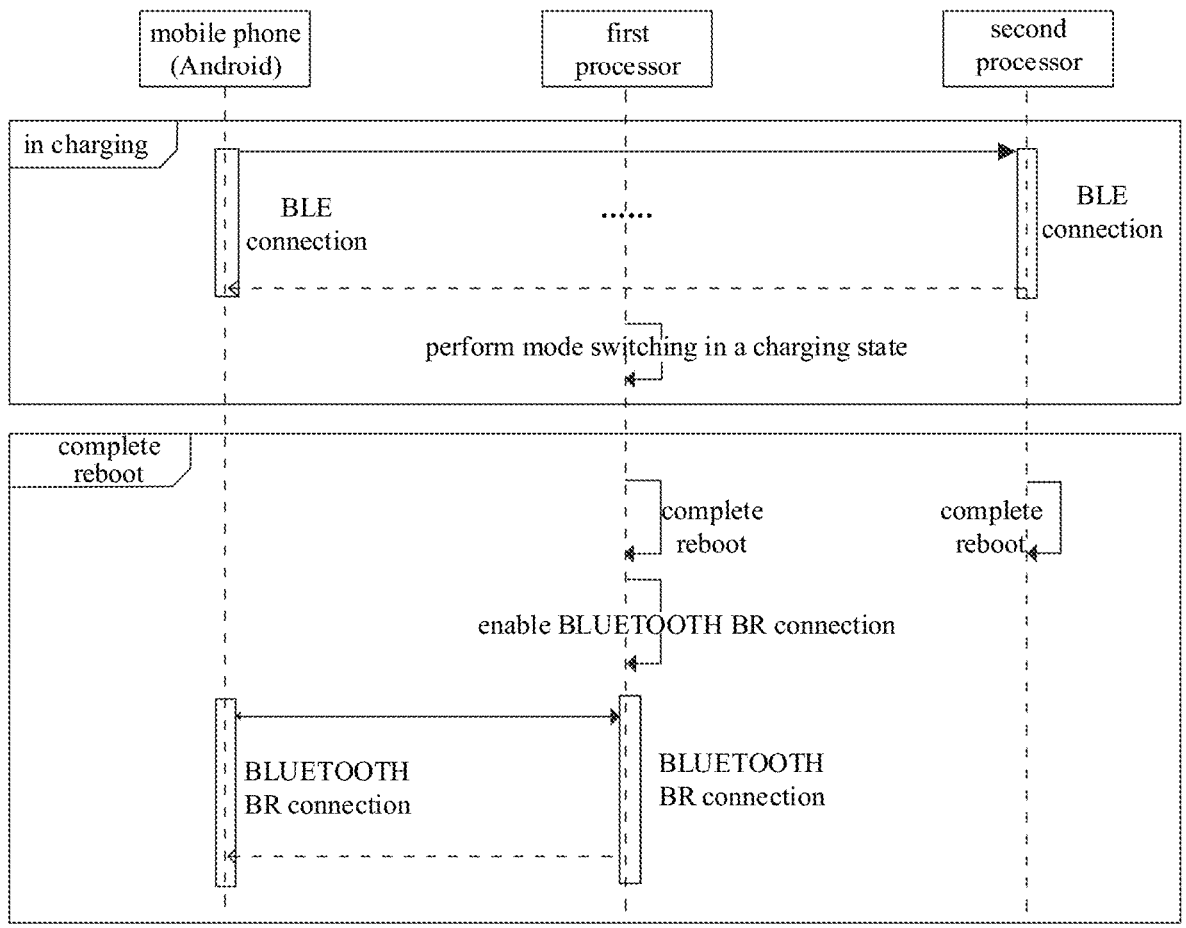
FIG. 8 is a schematic flowchart illustrating a second switching between the terminal and the wearable device according to some embodiments of the disclosure.

A third scenario refers to a switching process for sufficient battery-level. FIG. 8 is a schematic flowchart illustrating a second switching between the terminal and the wearable device according to some embodiments of the disclosure. As illustrated in FIG. 8, the process specifically includes operations as follows.

Operation 801 refers to charging.

Specifically, when the smartwatch is in a low battery-level state, the second processor controls the BLE and the mobile phone to be in the BLE connection state, and in response to determining the smartwatch in the low battery-level state enters a charging state, the mode switching operations are performed as follows.

Operation 802 refers to performing a complete restart on the smartwatch and enabling the mobile phone and the smartwatch enter into the BR connection state.

Specifically, when the smartwatch switches from the bracelet mode (i.e., the second operation mode) to the watch mode (i.e., the first operation mode), the smartwatch is complete rebooted, i.e., both the first processor and the second processor are restarted, and after the restart, the first processor enables BR BLUETOOTH, and the BR BLUETOOTH establishes the communication connection with the mobile phone.

In practice, when the smartwatch is switched from the watch mode to the bracelet mode, the complete restart of the smartwatch is not necessary, it is only required to shut down the first processor and the BR BLUETOOTH and thereby to disconnect the BR connection between the mobile phone and the smartwatch, and the BLE is then booted to enable the BLE connection state of the mobile phone and smartwatch.

Figure 9:
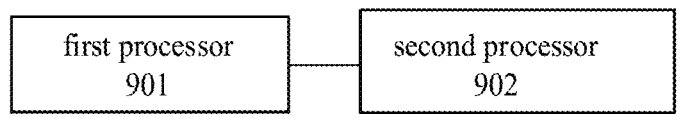
FIG. 9 is a schematic structural diagram of the wearable device according to some embodiments of the disclosure.

The embodiments of the disclosure further provide a wearable device. As illustrated in FIG. 9, the wearable device includes: a first processor 901 and a second processor 902.

Both of the first processor and the second processor are in working states when the wearable device is in a first operation mode; the first processor is in a non-working state while the second processor is in a working state when the wearable device is in a second operation mode.

The second processor 902 is configured to switch, in response to satisfying a first preset condition and a current operation mode not being the first operation mode, the wearable device to the first operation mode.

The first processor 901 is configured to switch, in response to satisfying a second preset condition and the current operation mode not being the second operation mode, the wearable device to the second operation mode.

In some embodiments, in the first operation mode, the first processor runs a first operating system, the second processor runs a second operating system, and the first processor and the second processor communicate with each other through a SPI; in the second operation mode, the second processor runs the second operating system.

Figure 10:
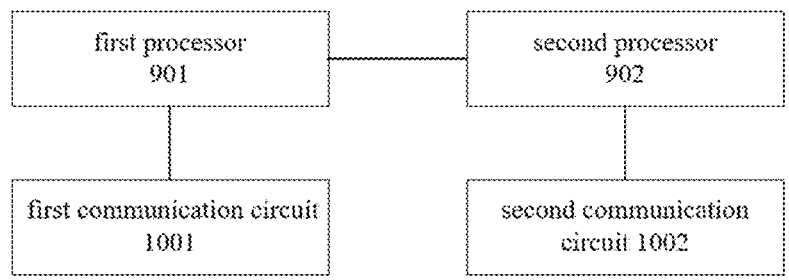
FIG. 10 is a schematic structural diagram of another wearable device according to some embodiments of the disclosure

In some embodiments, the wearable device further includes a first communication unit and a second communication unit (which are also referred to as a first communication circuit 1001, and a second communication circuit 1002, and illustrated in FIG. 10), and both of the first communication unit and the second communication unit are configured to establish communication connections of the wearable device with a terminal device; in the first operation mode, the first communication unit is in a working state, and the second communication unit is in a non-working state; in the second operation mode, the first communication unit is in a non-working state, and the second communication unit is in a working state.

In some embodiments, the wearable device further includes a first type of component and a second type of component (which are not illustrated in FIG. 9); in the first operation mode, the first operating system controls an operation of the first type of component, and the second operating system controls an operation of the second type of component; in the second operation mode, the second operating system controls operations of both the first type of component and the second type of component.

In some embodiments, the first processor 901 is specifically configured to: shut down the first processor and the first communication unit, and thereby disconnecting a communication connection between the terminal device and the first communication unit; enable the second communication unit and establish a communication connection between the terminal device and the second communication unit.

The second operating system is configured to take over and controlling the operation of the first type of component.

In some embodiments, before the shutting down the first processor and the first communication unit, the first processor 901 is further configured to: acquire mode switching information through communication connection and negotiation between the first communication unit and the terminal device, where the mode switching information is configured to indicate connection information for the wearable device after being switched to the second operation mode; enable the terminal device to search for the second communication unit according to the mode switching information and establish the communication connection with the second communication unit.

In some embodiments, the first processor 901 is specifically configured to: reboot the wearable device; enable the first communication unit and establishing a communication connection between the terminal device and the first communication unit.

The first operating system controls the operation of the first type of component.

In some embodiments, after the wearable device being connected to the terminal device, the first communication unit is configured to transmit, in response to the current operation mode being the first operation mode, connection configuration information of the second communication unit to the terminal device.

After the wearable device being connected to the terminal device, the second communication unit is configured to transmit, in response to the current operation mode being the second operation mode, connection configuration information of the first communication unit to the terminal device.

In some embodiments, the first operation mode is a watch mode, and the second operation mode is a bracelet mode; the first processor is an AP, and the second processor is a MCU; the first operating system is an Android operating system, and the second operating system is a RTOS; the first communication unit is a classic BLUETOOTH module of BR/EDR, and the second communication unit is a BLUETOOTH module of BLE.

The first type of component includes: a display device, a touch control device, and an unlocking device.

The second type of component includes: a cardiotachometer, a sphygmomanometer, an accelerometer, a gyroscope, a magnetometer, and a sensitometer.

The first preset condition includes any one of the following conditions that: a battery level of the wearable device is greater than a first battery level threshold, the wearable device is detected as entering a charging state, and a first switching instruction configured to instruct the wearable device to switch to the first operation mode is detected.

The second preset condition includes any one of the following conditions that: the battery level of the wearable device is less than a second battery level threshold, and a second switching instruction configured to instruct the wearable device to switch to the second operation mode is detected.

In some embodiments, the second processor 902 is further configured to switch, in response to satisfying a third preset condition and the current operation mode not being a third operation mode, the wearable device to the third operation mode; in the third operation mode, the first processor is in a working state, and the second processor is in a non-working state.

For example, the third preset condition includes: detecting a third switch instruction configured to instruct the wearable device to switch to the third operation mode. The current operation mode may be the first operation mode or the second operation mode.

In some embodiments, in the third operation mode, the first communication unit is in a working state, and the second communication unit is in the un-working state, the first processor 901 is configured to control the first communication unit to establish a communication connection with the terminal device.

In some other embodiments, in the third operation mode, both of the first communication unit and the second communication unit are in un-working states, that is, the communication connection between the wearable device and the terminal device is disconnected.

In some embodiments, the wearable device further includes a memory, the memory is configured to store computer programs that can be run on the first processor and the second processor. The computer programs stored in the memory, when being executed by the first processor and the second processor, implements operations of the method according to the embodiments of the disclosure Certainly, various components in the wearable device are coupled together via a bus system in practice. It can be understood that the bus system is configured to enable the connection and communication between the components. In addition to a data bus, the bus system further includes a power bus, a control bus, and a status signal bus.

Based on the above technical solutions, the wearable device is provided with the structure of dual-core processor and various operation modes, and the two processors control the wearable device to work in the various operation modes for different usage scenarios, so as to meet the usage requirements of different scenarios.

Embodiments of the disclosure further provide a non-transitory computer-readable storage medium stored with a computer program, where the computer program is configured to, when executed by processors, implements operations of the method according to any one of the above embodiments.

In practice, the above processors may further be at least one of: an application specific integrated circuit (ASIC), a digital signal processing device (DSPD), a programmable logic device (PLD), and a field-programmable gate array (FPGA), a controller, a microcontroller, and a microprocessor. It can be understood that, for different apparatus, other electronic components may also be used to implement the above-mentioned processor function, which is not specifically limited to the illustrated embodiments of the disclosure.

The memory provides instructions and data to the processor, where the memory may be a volatile memory such as a random access memory (RAM), or be a non-volatile memory such as a read-only memory (ROM), a flash memory, a hard disk drive (HDD), a solid-state drive (SSD), or be a combination of the above types.

The embodiments of the disclosure provide a switching method, a wearable device, and a storage medium. The method is performed by the wearable device including a first processor and a second processor, and the method includes: switching, in response to satisfying a first preset condition and a current operation mode not being a first operation mode, an operation mode of the wearable device to the first operation mode; switching, in response to satisfying a second preset condition and the current operation mode not being a second operation mode, the operation mode of the wearable device to the second operation mode; in the first operation mode, both of the first processor and the second processor are in working states; and in the second operation mode, the first processor is in a non-working state and the second processor is in a working state. In this way, the wearable device is provided with the structure of dual processor and various operation modes, and the two processors control the wearable device to work in the various operation modes in different usage scenarios, thereby meeting the usage requirements of different scenarios.

It should be noted that terms such as "first", and "second" are used to distinguish similar objects but cannot be understood as indicating a specific order or sequence.

The methods disclosed in various method embodiments of the disclosure may be arbitrarily combined without conflict to obtain a new method embodiment.

The features disclosed in various product embodiments of the disclosure may be arbitrarily combined without conflict to obtain a new product embodiment.

The features disclosed in various method embodiments or apparatus embodiments of the disclosure may be arbitrarily combined without conflict to obtain a new method embodiment or a new apparatus embodiment.

The above description only provides the specific embodiments of the disclosure, but the protection scope of the disclosure is not limited thereto. Any variations or substitutions easily conceivable by a person skilled in the art within the technical scope of the disclosure should be included within the protection scope of the disclosure. Therefore, the protection scope of the disclosure should be subjected to the protection scope of the appended claims.

What is claimed is:

1. A switching method, performed by a wearable device comprising a first processor and a second processor, wherein the method comprises:
    switching, in response to satisfying a first preset condition and a current operation mode not being a first operation mode, the wearable device to the first operation mode;
    switching, in response to satisfying a second preset condition and the current operation mode not being a second operation mode, the wearable device to the second operation mode;
    wherein in the first operation mode, both of the first processor and the second processor are in working states; and in the second operation mode, the first processor is in a non-working state and the second processor is in a working state;
    wherein the wearable device further comprises a first communication circuit and a second communication circuit, and both of the first communication circuit and the second communication circuit are configured to establish communication connections of the wearable device with a terminal device; in the first operation mode, the first communication circuit is in a working state, and the second communication circuit is in a non-working state; and in the second operation mode, the first communication circuit is in a non-working state, and the second communication circuit is in a working state;
    wherein the switching the wearable device to the second operation mode when the current operation mode is the first operation mode, comprises:
        shutting down the first processor and the first communication circuit; and
        enabling the second communication circuit;
    wherein before the shutting down the first processor and the first communication circuit, the method further comprises:
        acquiring mode switching information through communication connection and negotiation between the first communication circuit and the terminal device, wherein the mode switching information is configured to indicate connection information for the wearable device after being switched to the second operation mode; and
    wherein the enabling the second communication circuit, comprises:
        enabling the second communication circuit, and searching for the second communication circuit according to the mode switching information and establishing the communication connection with the second communication circuit, by the terminal device.

2. The method as claimed in claim 1, wherein the first processor is a master processor, and the second processor is a coprocessor, wherein power consumption of the master processor is greater than power consumption of the coprocessor.

3. The method as claimed in claim 1, wherein in the first operation mode, the first processor runs a first operating system, the second processor runs a second operating system, and the first processor and the second processor communicate with each other through a serial peripheral interface (SPI);

wherein in the second operation mode, the second processor runs the second operating system.

4. The method as claimed in claim 3, wherein the wearable device further comprises a first type of component and a second type of component;
wherein in the first operation mode, the first operating system controls an operation of the first type of component, and the second operating system controls an operation of the second type of component;
wherein in the second operation mode, the second operating system controls operations of both the first type of component and the second type of component.

5. The method as claimed in claim 1, wherein the switching the wearable device to the first operation mode when the current operation mode is the second operation mode, comprises:
rebooting the wearable device; and
enabling the first communication circuit.

6. The method as claimed in claim 1, wherein the switching the wearable device to the first operation mode when the current operation mode is the second operation mode, comprises:
enabling the first communication circuit without rebooting the wearable device.

7. The method as claimed in claim 1, after the wearable device being connected to the terminal device, the method further comprising:
transmitting, in response to the current operation mode being the first operation mode, connection configuration information of the second communication circuit to the terminal device;
transmitting, in response to the current operation mode being the second operation mode, connection configuration information of the first communication circuit to the terminal device.

8. The method as claimed in claim 1, wherein, the first communication circuit is a classic BLUETOOTH module, and the second communication circuit is a BLUETOOTH module of BLUETOOTH low energy.

9. The method as claimed in claim 1, wherein power consumption of the first operation mode is greater than power consumption of the second operation mode.

10. The method as claimed in claim 9, wherein the first preset condition comprises any one of the following conditions that: a battery level of the wearable device is greater than a first battery level threshold, the wearable device is detected as entering a charging state, and a first switching instruction configured to instruct the wearable device to switch to the first operation mode is detected; and
the second preset condition comprises any one of the following conditions that: the battery level of the wearable device is less than a second battery level threshold, a second switching instruction configured to instruct the wearable device to switch to the second operation mode is detected, and the wearable device has been in the first operation mode for over a certain period without detecting any operation instruction.

11. The method as claimed in claim 1, further comprising:
switching, in response to satisfying a third preset condition and the current operation mode not being a third operation mode, the wearable device to the third operation mode;
wherein in the third operation mode, the first processor is in a working state, and the second processor is in a non-working state.

12. The method as claimed in claim 11, wherein when the third operation is a daytime usage mode, and the third preset condition comprises any one of the following conditions that: a system time of the wearable device belongs to daytime corresponding to a time zone in which the wearable device is located, and an ambient brightness is greater than a preset brightness threshold;
when the third operation is a nighttime usage mode, and the third preset condition comprises any one of the following conditions that: the system time of the wearable device belongs to nighttime corresponding to the time zone in which the wearable device is located, and the ambient brightness is less than the preset brightness threshold.

13. The method as claimed in claim 1, wherein in the first operation mode, the first processor runs a first operating system;
wherein in the second operation mode, the second processor runs a second operating system different from the first operating system.

14. A wearable device, comprising: a first processor and a second processor;
wherein both of the first processor and the second processor are in working states when the wearable device is in a first operation mode; wherein the first processor is in a non-working state while the second processor is in a working state when the wearable device is in a second operation mode;
wherein the second processor is configured to switch, in response to satisfying a first preset condition and a current operation mode not being the first operation mode, the wearable device to the first operation mode;
wherein the first processor is configured to switch, in response to satisfying a second preset condition and the current operation mode not being the second operation mode, the wearable device to the second operation mode;
wherein the wearable device further comprises a first communication circuit and a second communication circuit; both of the first communication circuit and the second communication circuit are configured to establish communication connections of the wearable device with a terminal device; in the first operation mode, the first communication circuit is in a working state, and the second communication circuit is in a non-working state; in the second operation mode, the first communication circuit is in a non-working state, and the second communication circuit is in a working state;
wherein in response to satisfying the second preset condition and the current operation mode not being the second operation mode, the wearable device is configured to shut down the first processor and the first communication circuit, and enable the second communication circuit; and
wherein before the first processor and the first communication circuit are shut down, the first communication circuit is configured to transmit mode switching information to the terminal device through communication connection and negotiation between the first communication circuit and the terminal device, wherein the mode switching information comprises connection information for the wearable device after being switched to the second operation mode and a switching time, and the connection information is configured to instruct the terminal device to search for the second communication circuit; and
wherein the second communication circuit is configured to establish, according to the switching time, a communication connection with the terminal device.

15. The wearable device as claimed in claim 14, wherein the wearable device further comprises a first type of component and a second type of component;
- in the first operation mode, the first processor runs a first operating system which controls an operation of the first type of component, the second processor runs a second operating system which controls an operation of the second type of component, and the first processor and the second processor communicate with each other through a serial peripheral interface (SPI);
- wherein in the second operation mode, the second processor runs the second operating system which controls the first type of component and the second type of component.

16. The wearable device as claimed in claim 14, wherein the first processor is a master processor, and the second processor is a coprocessor; the first communication circuit is a classic BLUETOOTH module, and the second communication circuit is a BLUETOOTH module of BLUETOOTH low energy.

17. The wearable device as claimed in claim 14, wherein the first communication circuit is configured to transmit connection configuration information of the second communication circuit to the terminal device, when the current operation mode is the first operation mode; and
- wherein the second communication circuit is configured to transmit connection configuration information of the first communication circuit to the terminal device, when the current operation mode is the second operation mode.

18. A non-transitory computer-readable storage medium storing a computer program, wherein the computer program is configured to, when executed by processors, implement a switching method comprising:
- switching, in response to satisfying a first preset condition and a current operation mode not being a first operation mode, a wearable device to the first operation mode;
- switching, in response to satisfying a second preset condition and the current operation mode not being a second operation mode, the wearable device to the second operation mode;
- wherein the wearable device comprises a first processor, a second processor, a first communication circuit, and a second communication circuit;
- in the first operation mode, both of the first processor and the second processor are in working states, the first processor controls the first communication circuit to establish a connection with a terminal device, and the second communication circuit is in a non-working state;
- in the second operation mode, the first processor is in a non-working state and the second processor is in a working state, the second processor controls the second communication circuit to establish a connection with the terminal device, and the first communication circuit is in a non-working state;
- wherein the switching the wearable device to the second operation mode when the current operation mode is the first operation mode, comprises:
  - shutting down the first processor and the first communication circuit; and
  - enabling the second communication circuit;
- wherein before the shutting down the first processor and the first communication circuit, the method further comprises:
  - acquiring mode switching information through communication connection and negotiation between the first communication circuit and the terminal device, wherein the mode switching information is configured to indicate connection information for the wearable device after being switched to the second operation mode; and
- wherein the enabling the second communication circuit, comprises:
  - enabling the second communication circuit, and searching for the second communication circuit according to the mode switching information and establishing the communication connection with the second communication circuit, by the terminal device.

19. The non-transitory computer-readable storage medium as claimed in claim 18, wherein the first processor is a master processor, and the second processor is a coprocessor; the first communication circuit is a classic BLUETOOTH module, and the second communication circuit is a BLUETOOTH module of BLUETOOTH low energy.

20. The non-transitory computer-readable storage medium as claimed in claim 18, wherein in the first operation mode, the first processor runs a first operating system, the second processor runs a second operating system, and the first processor and the second processor communicate with each other through a serial peripheral interface (SPI);
- wherein in the second operation mode, the second processor runs the second operating system;
- wherein the wearable device further comprises a first type of component and a second type of component;
- wherein in the first operation mode, the first operating system controls an operation of the first type of component, and the second operating system controls an operation of the second type of component;
- wherein in the second operation mode, the second operating system controls operations of both the first type of component and the second type of component.

* * * * *